May 19, 1970  G. A. TINNERMAN  3,512,222

PANEL CLIP

Filed Feb. 27, 1968

INVENTOR
GEORGE A. TINNERMAN

BY Revere B. Curley

ATTORNEY

United States Patent Office 3,512,222
Patented May 19, 1970

3,512,222
PANEL CLIP
George A. Tinnerman, 17864 Beach Road,
Lakewood, Ohio 44107
Filed Feb. 27, 1968, Ser. No. 708,605
Int. Cl. F16b 5/06
U.S. Cl. 24—73       5 Claims

ABSTRACT OF THE DISCLOSURE

A clip to connect the plane flange in the channel flange of adjoining panels is formed of channel shape, with tongues struck out from the walls and extending toward the open side to engage a side wall of the channel shape flange and tongues struck out and facing in the opposite direction to engage the plane flange, the projections or tongues thereby preventing withdrawal of the plane flange from the channel shape flange.

NATURE AND OBJECTS OF INVENTION

This invention resides in a clip to hold together panels used principally in building construction. These panels may be made of metal, although other materials, such as plastic or fiberglass may be used. The panels are formed with a plane flange along one longitudinal edge and a channel shape flange along the other edge. When the panels are assembled in a building, the plane edge of one panel fits within the channel shape edge of the other.

Various methods have been used to secure the panels together, including punching or welding. These methods destroy the surface finish at the fastening positions, and result in corrosion as well as being unsightly. Many of the metal panels have a durable finish and these methods cannot be used so as to destroy this surface along the flanges.

The principal object of this invention is to provide a clip for securing together the flanges of adjoining panels. This clip is a channel shape clip which fits within the channel shape flange and has tongues or projections to engage or bite into the wall of the channel shape flange. The clip also straddles the plane flange within the channel shape flange and has additional tongues or projections to engage the plane flange.

The type of clip illustrated may be manufactured easily and cheaply by simple cutting and bending operations on mass production machines. After cutting and bending to the proper shape, the clip in use is connected to one flange by pressing or driving and then forced on the other flange when the two flanges are forced together.

This clip is especially adapted to metal panels coated with a durable surface, as the clip will not contact or disturb the exposed surface. Its use is by no means imited to metal panels, as it may be used in this type of joint with any other material.

DRAWINGS

DESCRIPTION

Figure 1:
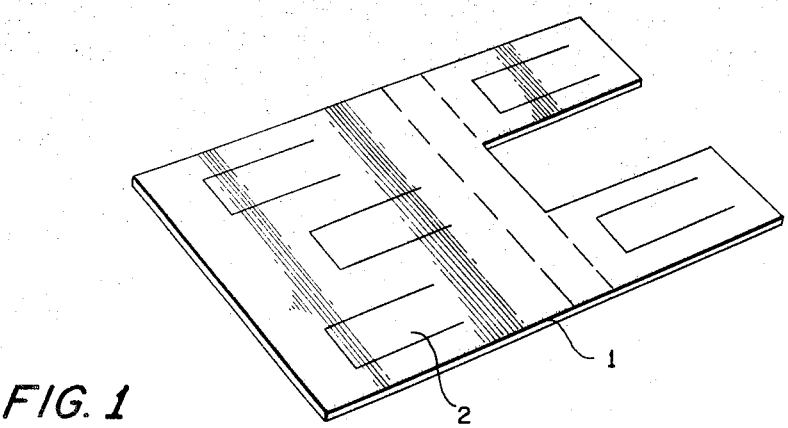
FIG. 1 is a perspective of a blank from which the clip is formed.

The panel clip of this invention is cut out of a single piece of sheet metal, as shown by the preformed element 1 in FIG. 1. This element may be cut from a strip and has the tongues 2 cut at the same time. The preformed element is then bent to form the channel shape clip 3 with walls 4, 5 connected by the bight 6.

The clip 3 is designed to retain adjoining panels 10, 11 assembled with the straight flange 12 of panel 10 positioned within the channel shape flange 13 of panel 11. Clips 3 fit within the channel flange 13 and engage both flanges 12 and 13 to prevent their separation.

The wall 4 of the clip 3 is provided with tongues or projections 8 struck out from the wall to engage a side of the channel shape flange 13. Each tongue 8 is integrally connected adjacent the bight 6 and extends outwardly and toward the open side of the clip so that its end 14 will engage frictionally the wall of channel shape flange 13.

The tongues or projections 9 are integrally connected to the wall 5 adjacent the open side of the clip and extend inwardly toward the opposite wall 4 and toward the bight 6 so that the free ends are adjacent the bight. These tongues engage the straight flange 12 of the panel 10.

Figure 3:
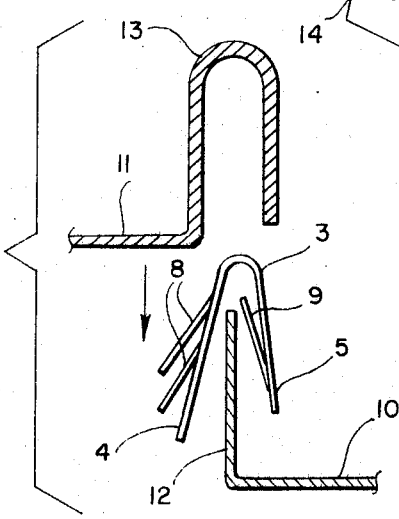
FIG. 3 is an exploded view of the flanges of adjoining panels in cross section with the clip between prior to assembly.
Figure 4:
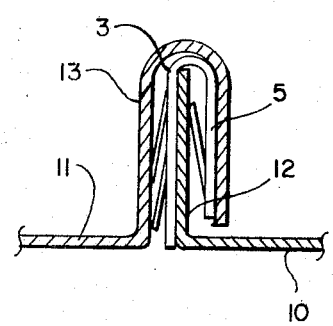
FIG. 4 is a cross section of the flanges assembled with the clip in position.

As shown in FIG. 3, the clip may straddle the straight flange 12 on panel 10 and is pressed into the channel shape flange 13 on panel 11. When the flanges are in assembled position, as seen in FIG. 4, the clip is compressed between the sides of the channel shape flange 13. The tongues or projections 8 on wall 4 have their ends directed toward the open end of the clip, so that their ends engage the side of the channel shape flange 13 and resist movement of the flange from the clip 3. The tongues or projections 9 have their ends directed toward the bight and resist movement of the straight flange 12 from the clip. In this manner, the clips 3 prevent removal of straight flange 12 from the channel shape flange 13 and so connect the adjoining panels.

Figure 2:
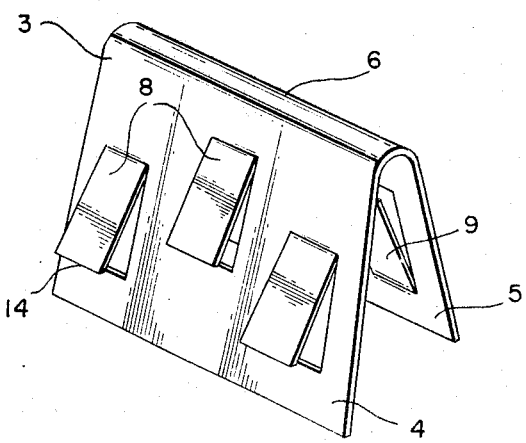
FIG. 2 is a perspective view of the completed clip.

While tongues 8 and 9 are shown on different walls, they may be formed on both walls. It would also be within the invention to stagger the tongues, as in FIG. 2, or to form them of different lengths.

Figure 5:
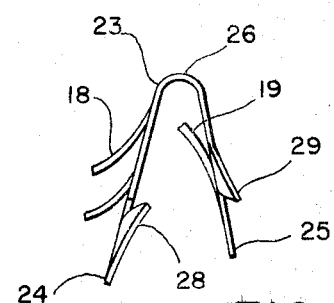
FIG. 5 is an elevational view of a modified form of clip.

In a modified form of the invention shown in FIG. 5, the clip 23 is formed with tongues 18, 19 as in FIGS. 1 to 4, and is also provided the walls 24, 25 with projections 28, 29. The wall 24 having tongues 18 has a projection 28 on each edge cut out of the edge of the wall and bent inwardly with a pointed end directed toward the bight 26. The other wall 25 has a projection 29 cut out of the edge of the wall and bent outwardly with the pointed end directed toward the open end of the clip.

The wall 24 has the curved tongues or projections 18 projecting outwardly and directed toward the open side of the clip to engage a side of channel shape flange 13, and also projections 28 projecting inwardly and directed toward the bight to engage straight flange 12. The wall 25 has the curved tongues or projections 19 projecting inwardly and directed toward the bight to engage straight flange 12 and the projections 29 projecting outwardly and directed toward the open side of the clip to engage a side of the channel shape flange 13. The curved tongues 18, 19 engage the flanges at a greater angle than the straight tongues to provide greater frictional engagement.

I claim:

1. A clip for connecting a straight flange on one edge of a panel in a channel shape flange on the edge of an adjoining panel comprising a substantially channel shape clip bent from one piece of sheet metal to form side walls at an acute angle to each other connected by a bight, said clip having tongues struck out from at least one wall between the ends of said one wall and projecting outwardly from said clip and toward the open side of said clip to engage a side of the channel shape flange when positioned in said channel shape flange, and having other tongues struck out from the other wall between the ends of said other wall and projecting inwardly of said clip toward said one wall and toward the bight to engage the plane flange when within the channel shape flange.

2. A clip as claimed in claim 1, the one wall having outwardly projecting tongues being provided with inwardly projecting teeth having pointed ends directed toward the bight of the clip to engage the straight flange and the other wall having inwardly projecting tongues being provided with outwardly projecting teeth having pointed ends directed toward the open side of the clip to engage a wall of the channel.

3. A clip for connecting adjoining panels, one of which has a straight flange received in a channel shape flange on the adjoining panel, comprising a channel shape clip bent from a single piece of sheet metal to form side walls connected by a bight, one wall of said clip having a tongue struck out from the wall integrally connected to the wall adjacent the open side of the clip and projecting inwardly of the clip toward the other wall with the free end of the tongue toward the bight of the clip, the other wall of the clip having a tongue struck out from the wall integrally connected to the wall adjacent the bight and projecting outwardly from the clip with the free end of the tongue toward the open side of the clip, each of said walls having its opposite side flat and free of projections, said clip when positioned within the channel flange and straddling the straight flange having its first tongue engaging the straight flange to prevent withdrawal from the channel shape flange and its second tongue engaging the side of a channel shape flange to prevent its removal from the straight flange and the opposite flat sides of said walls engaging one side of the channel shape flange and one side of the plane flange, respectively.

4. A clip as defined in claim 3, in which the side walls of the clip are at an acute angle to each other, so that upon insertion in the channel flange the flat sides of the walls will be pressed together into substantially parallel relation.

5. In the combination of two adjoining panels, one of which has a straight flange received in a channel shape flange on the adjoining panel, a channel shape clip bent from a single piece of sheet metal to form side walls at an acute angle to each other connected by a bight and with the walls normally spaced at the open side of the clip a distance greater than the width of said channel, each of said walls having projections between the ends of the wall bent outwardly from the wall and formed with their ends extending toward the open side of said clip, so that the ends of said projections on the walls engage the side walls of said channel shape flange, and each wall having other projections bent inwardly from said wall toward the other wall with their ends extending toward the bight of said clip so that the inwardly bent projections engage the straight flange between the projections on the walls of the clip, said clip being compressed when inserted in said channel shape flange to increase the engagement between said tongues and projections and said flanges.

References Cited

UNITED STATES PATENTS

| 1,862,227 | 6/1932 | Mahon | 287—189.35 |
| 2,216,219 | 10/1940 | Wiley | 24—73 |
| 2,295,444 | 9/1942 | Woodward. | |

FOREIGN PATENTS 233,136   2/1961   Australia.

DONALD A. GRIFFIN, Primary Examiner

U.S. Cl. X.R.

287—189.35